F. M. STEVES.
Grain-Drill.
No. 218,461. Patented Aug. 12, 1879.
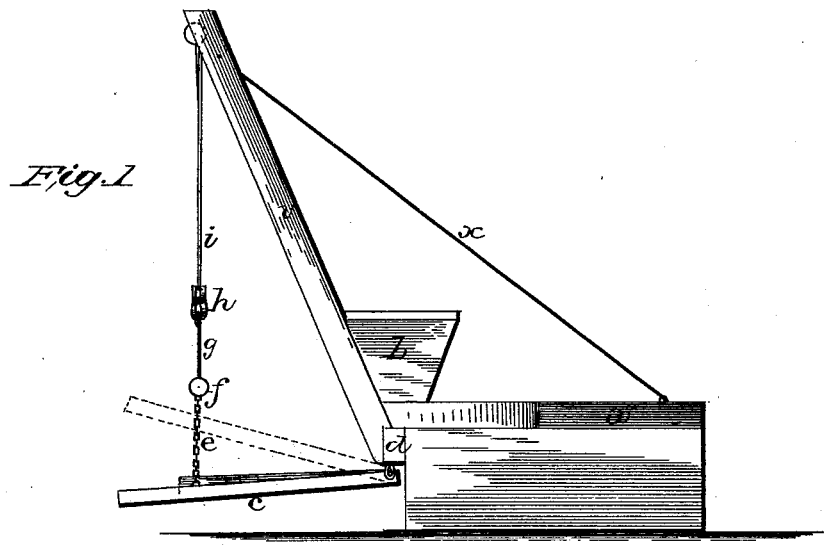
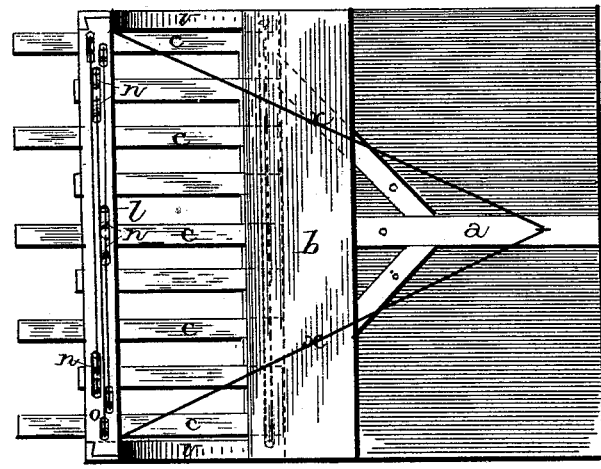
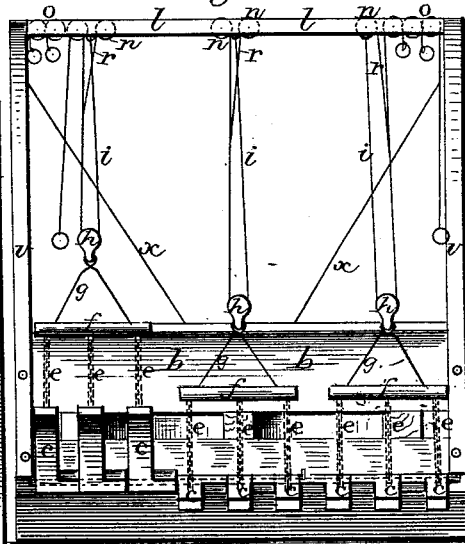

UNITED STATES PATENT OFFICE.

FRANCIS M. STEVES, OF LOUISVILLE, WISCONSIN.

IMPROVEMENT IN GRAIN-DRILLS.

Specification forming part of Letters Patent No. 218,461, dated August 12, 1879; application filed July 1, 1879.

*To all whom it may concern:*

Be it known that I, FRANCIS M. STEVES, of Louisville, in the county of Dunn and State of Wisconsin, have invented certain new and useful Improvements in Grain-Drills; and I do hereby declare the following to be a full, clear, and exact description of the invention, such as will enable others skilled in the art to which it pertains to make and use it, reference being had to the accompanying drawings, which form part of this specification.

My invention relates to an improvement in grain-drills; and it consists in connecting the drills together in sets, and having a cord or chain attached to each set, extending to each end of the frame, just behind the wheel, whereby the operator in walking behind the wheel at either side can raise any one or more sets of drills, so as to enable them to pass over obstructions, as will be more fully described hereinafter.

Figure 1 is a side elevation of my invention. Fig. 2 is a plan view, and Fig. 3 is a rear view, of the same.

$a$ represents the tongue; $b$, the seed-box; and $c$, the drill-bars, which are pivoted or otherwise loosely attached to the axle $d$. These drill-bars are connected together in sets of two, three, or more, at their rear ends, and are fastened by the chains $e$ to the rods $f$. Each rod $f$ is fastened, by a chain or wire, $g$, to a pulley, $h$, which is held suspended by a cord, wire, or chain, $i$, from the cross-beam $l$. These wires or chains $i$ are fastened at one end to the under side of the beam $l$, then pass down under the pulleys $h$, and then up over the pulleys $n$, journaled in the beam, and down over one of the pulleys $o$ at the end of the beam.

As the drill-bars carrying the drill-teeth with them are designed to be elevated from either end of the frame alike, to each wire or chain $i$ is fastened a second wire or chain, $r$, a short distance below the beam $l$, which chain or wire $r$ runs to the opposite end of the beam, and hangs down from the one $i$.

As the ends of the chains, cords, or wires $i$ $r$ are provided with rings or hand-holes, and hang down within easy reach of the operator, it is evident that as the operator walks along behind the wheel of the machine at either end, he can instantly raise any one or more of the sets of drills over an obstruction or to clean them of trash which may have become entangled around the teeth.

To clean the teeth of trash, it is only necessary to raise any one set by one of the chains $i$ or $r$, and then press down on the trash with the foot, and the teeth will at once be freed. By thus enabling the operator to raise any one or more sets of the drills from the ground at any moment, the teeth can be raised over obstructions, so as not to stop the team or get broken.

The beam $l$ is here shown as being supported upon the two standards $v$, which are braced by the rods $x$; but any other construction that may be preferred may be used.

Having thus described my invention, I claim—

1. In a grain-drill, the combination of two or more drill-bars connected together in sets, each set provided with cords, wires, or chains, which extend to both ends of the machine, whereby any one or more sets of the teeth can be raised over obstructions, substantially as shown.

2. In a grain-drill, the combination of the drill-bars $c$, chains $e$, rods $f$, pulleys $h$, chains $i$ $r$, beam $l$, and pulleys, substantially as set forth.

In testimony that I claim the foregoing I have hereunto set my hand this 21st day of June, 1879.

F. M. STEVES.

Witnesses:
 CARROLL LUCAS,
 W. H. LANDON.